United States Patent

Leppek et al.

[11] Patent Number: 5,163,743
[45] Date of Patent: Nov. 17, 1992

[54] ANTILOCK BRAKE CONTROL WHICH INDUCES REAR BRAKE LOCKUP UPON FRONT BRAKE LOCKUP

[75] Inventors: Kevin G. Leppek, Troy; Allen J. Walenty, Mt. Clemens, both of Mich.

[73] Assignee: General Motors Corporation, Detroit, Mich.

[21] Appl. No.: 808,146

[22] Filed: Dec. 16, 1991

[51] Int. Cl.$^5$ ............................................. B60T 8/58
[52] U.S. Cl. ................................. 303/100; 303/109; 303/111; 303/DIG. 4; 303/113.5; 364/426.02
[58] Field of Search ............... 303/111, 100, 110, 109, 303/DIG. 4, 103-105; 364/426.02

[56] References Cited

U.S. PATENT DOCUMENTS

| | | | |
|---|---|---|---|
| 4,505,520 | 3/1985 | Maehara | 303/119 SV |
| 4,835,695 | 5/1989 | Walenty et al. | 303/110 X |
| 4,850,650 | 7/1989 | Eckert et al. | 303/9.62 |
| 4,881,784 | 11/1989 | Leppek | 303/DIG. 4 X |
| 4,917,445 | 4/1990 | Leppek et al. | 303/DIG. 4 X |
| 5,015,040 | 5/1991 | Lin | 303/113 TR |
| 5,080,447 | 1/1992 | Leppek et al. | 303/DIG. 4 X |
| 5,106,171 | 4/1992 | Leppek et al. | 303/110 X |

Primary Examiner—Douglas C. Butler
Assistant Examiner—Josie A. Ballato
Attorney, Agent, or Firm—Howard N. Conkey

[57] ABSTRACT

A brake system for the rear wheels of a vehicle applies brake pressure to each rear wheel so as to establish the rear wheel speed at a predetermined relationship to the speed of the front wheel on the same side of the vehicle. The brake pressure applied to each of the front and rear wheels is limited by antilock controlled braking in response to a sensed incipient lockup condition of the wheel. When a front wheel first enters into an antilock controlled braking, in response to an incipient wheel lockup condition, the brake pressure to the rear wheel on the same side of the vehicle is rapidly increased to induce an incipient wheel lockup condition thereby inducing antilock controlled braking of the rear wheel.

4 Claims, 5 Drawing Sheets

ANTILOCK BRAKE CONTROL WHICH INDUCES REAR BRAKE LOCKUP UPON FRONT BRAKE LOCKUP

BACKGROUND OF THE INVENTION

This invention relates to a method and system for controlling the rear brakes of a vehicle.

During braking of an automotive vehicle, the rear wheels tend to experience a higher slip condition for a given brake torque than the front wheels due to the difference in the normal forces on the front and rear wheels. In order to provide a more balanced braking of the front and rear brakes of a vehicle and to establish desired vehicle braking characteristics and rear wheel braking performance, it is known to proportion the braking forces of the front and rear wheels to establish a desired relationship.

One system establishes a desired braking performance of the vehicle rear wheels by controlling the slip of the rear wheels to be substantially the same as the slip of the front wheels. This is accomplished by controlling the speed of the rear wheels so as to be substantially the same as the speed of the front wheels. By imposing substantial equality in the front and rear wheel speeds, the desired brake proportioning between the front and rear brakes is established.

SUMMARY OF THE INVENTION

In the system as set forth above, the rear wheel speeds may be controlled to be slightly above the speeds of the corresponding front wheels. As a result of this operation at lower wheel slip values, one or both of the front wheels may, in response to excessive braking effort experience an incipient wheel lockup condition requiring antilock controlled braking to limit the braking effort to prevent wheel lockup while the rear wheels remain in a stable braking condition or at least before the corresponding rear wheel experiences an incipient lockup condition. When a front wheel is undergoing antilock controlled braking, which typically results in rapid wheel speed cycling, there is no stable speed reference upon which the corresponding rear wheel speed may be based to control rear wheel braking.

Accordingly, this invention provides for forcing the rear wheel which is on the same side of the vehicle as a front wheel whose braking effort is being limited to prevent wheel lockup into an incipient wheel lockup condition. The rear wheel brake controller includes an antilock brake control function that responds to the incipient wheel lockup condition to provide wheel lock controlled braking of the rear wheel. This wheel lock controlled braking controls the wheel slip at the critical slip value resulting in the maximum braking effort to maintain stable braking of the rear wheel.

In accord with a specific aspect of this invention, when a front wheel first enters into an antilock control mode in response to an incipient wheel lockup condition, the brake pressure to the corresponding rear wheel (the rear wheel on the same side of the vehicle) is rapidly ramped upward until an incipient wheel lockup condition is sensed thereby inducing antilock controlled braking of the rear wheel.

DESCRIPTION OF THE DRAWINGS

The invention may be best understood by reference to the following description of a preferred embodiment and the drawings in which.

DESCRIPTION OF A PREFERRED EMBODIMENT

Figure 1:
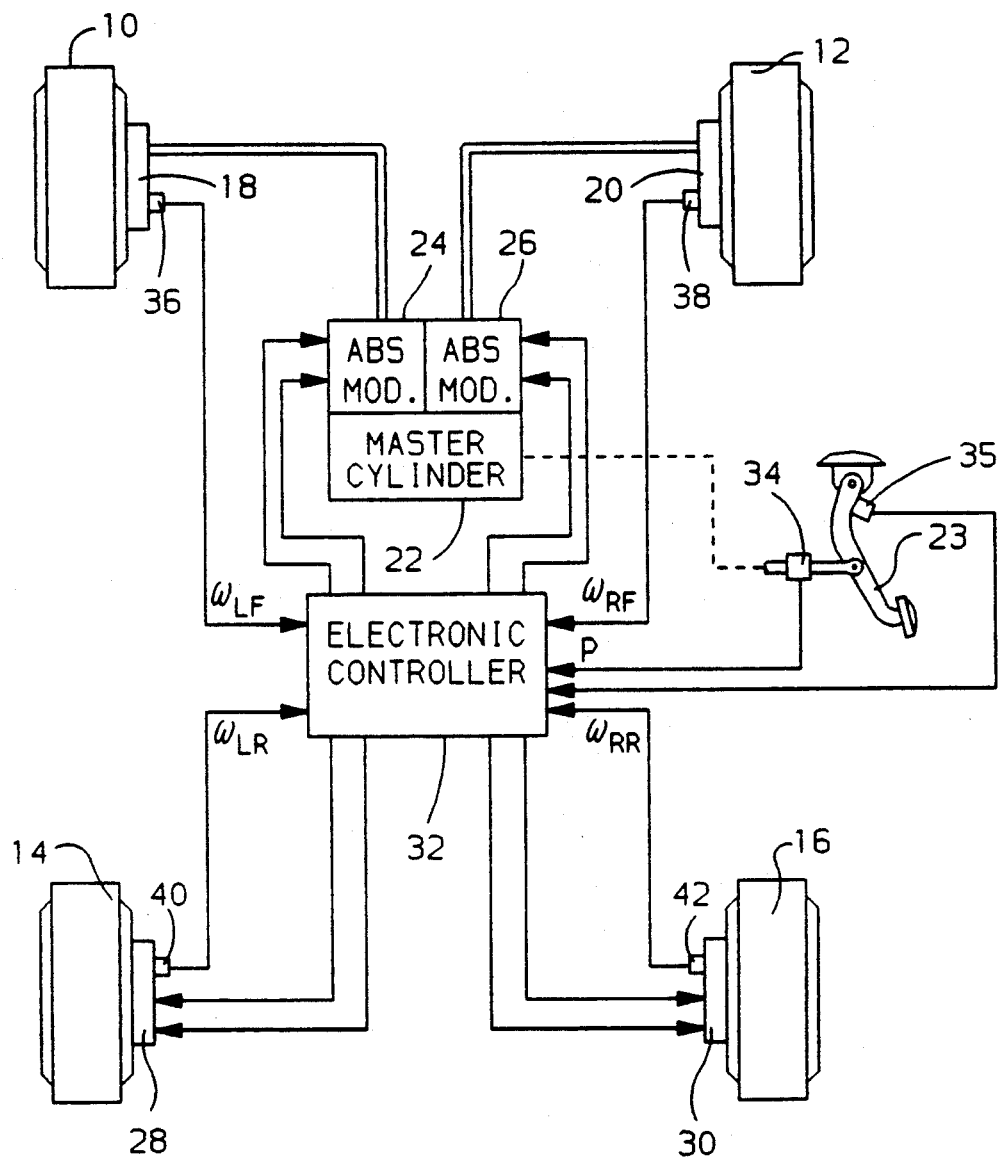
FIG. 1 is a diagram of a wheel braking system including an electronic controller for controlling the vehicle rear wheel brakes and for limiting the wheel brake pressures of the front and rear brakes for antilock brake control.

A vehicle braking system is illustrated in FIG. 1. In general, the vehicle includes left and right front driven wheels 10 and 12 and left and right rear non-driven wheels 14 and 16. The front wheels 10 and 12 have respective hydraulic actuated brakes 18 and 20 actuated by hydraulic pressure generated via a conventional master cylinder 22 operated by a brake pedal 23. The brakes 18 and 20 are operated though a pair of antilock brake system pressure modulators 24 and 26. In the preferred form, the modulators 24 and 26 take the form of a motor driven pressure modulator in which a piston is controlled by operation of a DC motor to modulate brake pressure. These pressure modulators may take the form of the modulator as illustrated in U.S. Pat. No. 4,917,445 issued on Apr. 17, 1990, and assigned to the assignee of this invention. In general, these modulators are transparent to the braking system during normal braking of the wheels 10 and 12 and are operable to limit brake pressure during antilock controlled braking.

In this embodiment, the rear wheels 14 and 16 have brake systems that include a pair of electrically operated brakes 28 and 30. The brakes 28 and 30 may each take the form of an electronically operated drum brake in which braking torque is established by operation of a DC torque motor and at a value proportional to the torque output of the DC torque motor.

The electric brakes 28 and 30 and the antilock brake system pressure modulators 24 and 26 are controlled by means of an electronic controller 32. In general, the controller 32 controls the current to the torque motors of the electric brakes 28 and 30 so as to generate a braking pressure establishing the speed of each rear wheel at a predetermined relationship to the speed of the corresponding front wheel 10 and 12 on the same side of the vehicle. For example, each rear wheel 14 and 16 may be controlled to a slightly higher speed (lower slip) than the speed of the front wheel 10 or 12 on the same side of the vehicle. Further, the electronic controller 32 controls the electric brakes 28 and 30 and the antilock brake system pressure modulators 24 and 26 so as to limit the brake pressure applied to any one of the wheels 10, 12, 14 and 16 to prevent wheel lockup.

The electronic controller 32 monitors the wheel speeds $\omega_{LF}$ and $\omega_{RF}$ of the left and right driven wheels 10 and 12 via speed sensors 36 and 38 and the wheel speeds $\omega_{RL}$ and $\omega_{RR}$ of the left and right undriven wheels 14 and 16 via speed sensors 40 and 42. The wheel speed assemblies are standard and may take the form of speed sensors typically used in antilock control systems for monitoring wheel speed. For example, these systems may be comprised of an exciter ring which is rotated with the wheel and an electromagnetic sensor which monitors the rotation of the exciter ring to provide a signal having a frequency proportional to wheel speed The electronic controller 32 then measures the frequency to establish the respective wheel speed. A force transducer 34 provides a measure of the brake pressure P applied to the brake pedal 23 by the vehicle operator and which represents the front wheel brake pressure established by the vehicle operator. Further a conventional normally closed brake switch 35 provides an indication of the operation of the brake pedal 23 by the operator. This switch is held open by the brake pedal 23 in the absence of force applied thereto by the operator.

The electronic controller 32 takes the form of a standard digital computer such as a Motorola MC68HC11 microcomputer along with the standard interface and driver circuits for interfacing and conditioning the input and output signals. For example, the wheel speed signals may be provided to a conventional interface and squaring circuit to be provided to the input of the microcomputer. Additionally, the output motor commands of the microcomputer may be provided to motor driver interface and an H-switch drivers to provide signals for controlling the motors associated with the modulators 24 and 26 and the motors associated with the electric brakes 28 and 30. The driver interface and H-switch driver for controlling the motors may take the form of the driver illustrated in the U.S. Pat. No. 4,835,695, issued May 30, 1989.

The operation of the electronic controller 32 in controlling the motors associated with the antilock brake system pressure modulators 24 and 26 and the electric brakes 28 and 30 in accord with this invention is illustrated in the FIGS. 2, 3a, 3b and 3c. The microcomputer contained within the electronic controller 32 has stored therein the instructions necessary to implement the algorithm as diagrammed in those figures.

Figure 2:
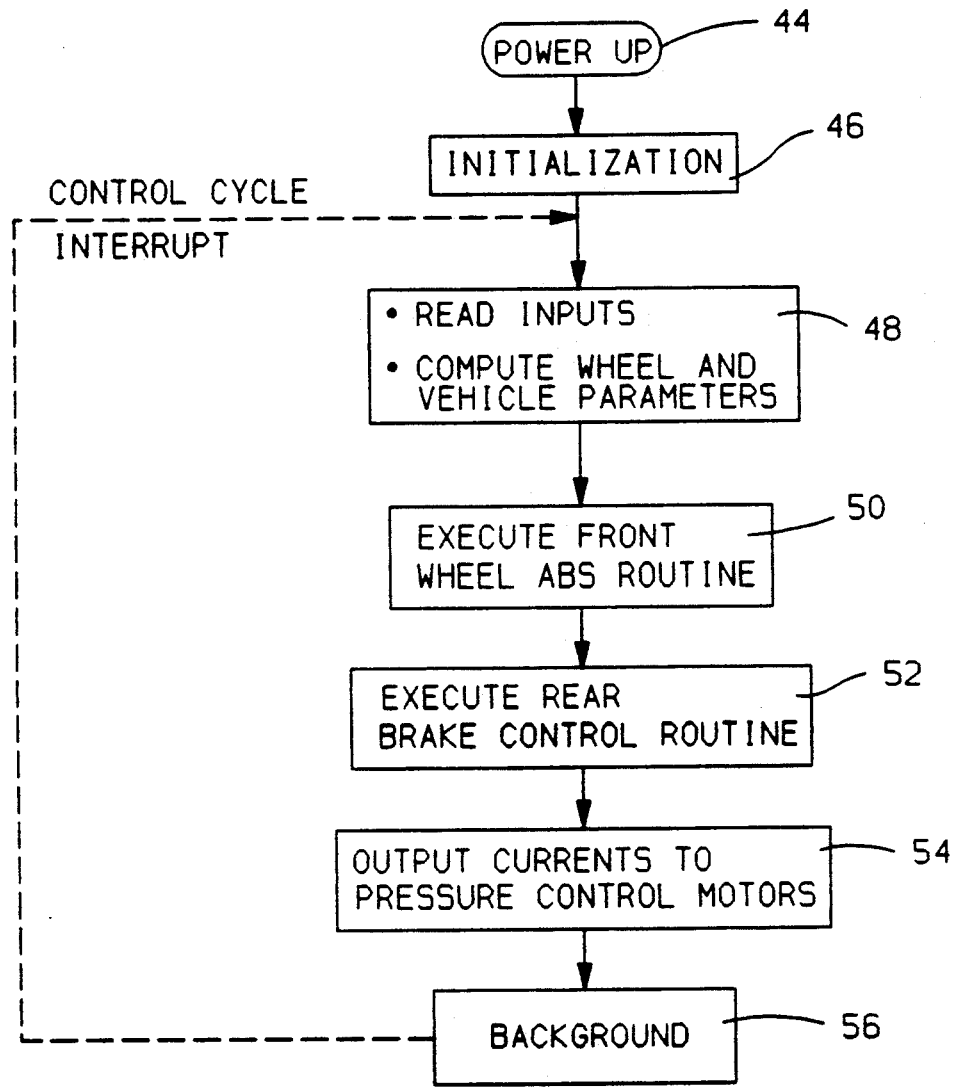
FIGS. 2, 3a, 3b and 3c are flow diagrams illustrating the operation of the electronic controller of FIG. 1 in accord with the principles of this invention.

Referring first to FIG. 2, when power is first applied to this system from a vehicle battery (not shown), the computer program is initiated at a point 44 and then provides for system initialization at step 46 which entails clearing registers, initializing various random access memory variables to calibrated values and other conventional functions. When the initialization routine is completed, the program then proceeds to perform brake control functions as required. These functions are performed by executing a control cycle in response to each of repeated control cycle interrupts which are generated by the microcomputer at predetermined fixed time intervals such as 8 milliseconds. Upon the occurrence of a control cycle interrupt, the microcomputer begins executing the functions embodied in the control cycle.

First, at step 48, the controller reads the various input signals and values including the pressure P of the pressure applied by the operator to the brake pedal 23, the state of the brake switch 35 and the wheel speed inputs from the speed sensors 36, 38, 40 and 42. Also at this step, the program computes the speeds of the individual wheels 10, 12, 14 and 16 as well as other parameters required for control, such as an estimation of vehicle speed based on the computed wheel speeds and individual wheel deceleration and slip values.

At step 50, the electronic controller 32 executes a front wheel antilock brake routine for limiting the brake pressure applied to the front wheel brakes 18 and 20 to prevent wheel lockup. This control is standard in form and provides for cyclically sensing an incipient lockup of a wheel resulting from the wheel slip exceeding a critical slip value based upon parameters including its slip and acceleration as determined at step 48, releasing brake pressure to allow recovery from the incipient lockup condition and reapplying brake pressure when wheel recovery is sensed.

The rear brakes are next controlled at step 52 and includes determining a motor current command $I_C$ for establishing the braking pressure during normal braking so as to establish the speed of each rear wheel at a speed that is slightly higher than the speed of the corresponding front wheel on the same side of the vehicle. This step also provides for controlling the motor current command $I_C$ for antilock controlled braking in response to a sensed incipient wheel lockup condition to limit the brake pressure applied to each of the rear wheels 14 and 16 so as to prevent wheel lockup. According to this invention, when step 50 first senses an incipient lockup condition of a front wheel and begins to limit the applied brake pressure to prevent lockup, the brake pressure to the rear wheel on the same side of the vehicle is rapidly increased by increasing the value of the motor current command $I_C$ until an incipient wheel lockup condition is sensed thereby inducing entry into antilock controlled braking of the rear wheel.

At step 54, the program outputs the respective motor current commands $I_C$ to the pressure control motors associated with the antilock brake pressure modulators 24 and 26 and the electric brakes 28 and 30 to establish the desired braking characteristics. Thereafter, the program proceeds to perform background tasks at step 56. These tasks may include diagnostic functions as well as other functions. The foregoing steps 48–56 are repeated once for each control cycle. Thus, when a control cycle interrupt occurs, a new cycle begins at step 48 and the functions represented by steps 48 through 56 are again repeated as previously described. Repeated executions of those steps provide for control of the rear brakes 28 and 30 and provide for antilock controlled braking of each of the wheels as required.

Figure 3A:
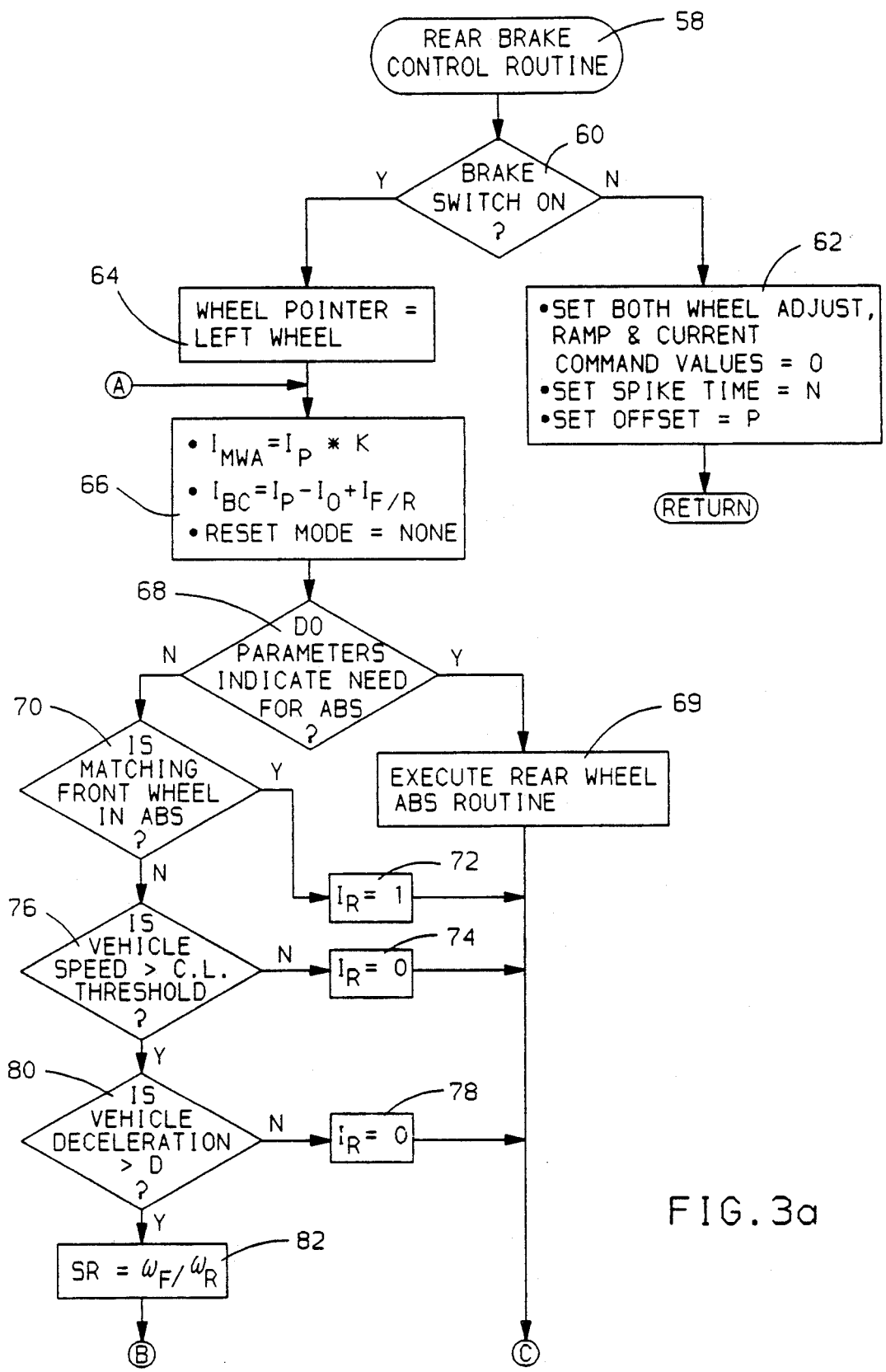
Figure 3B:
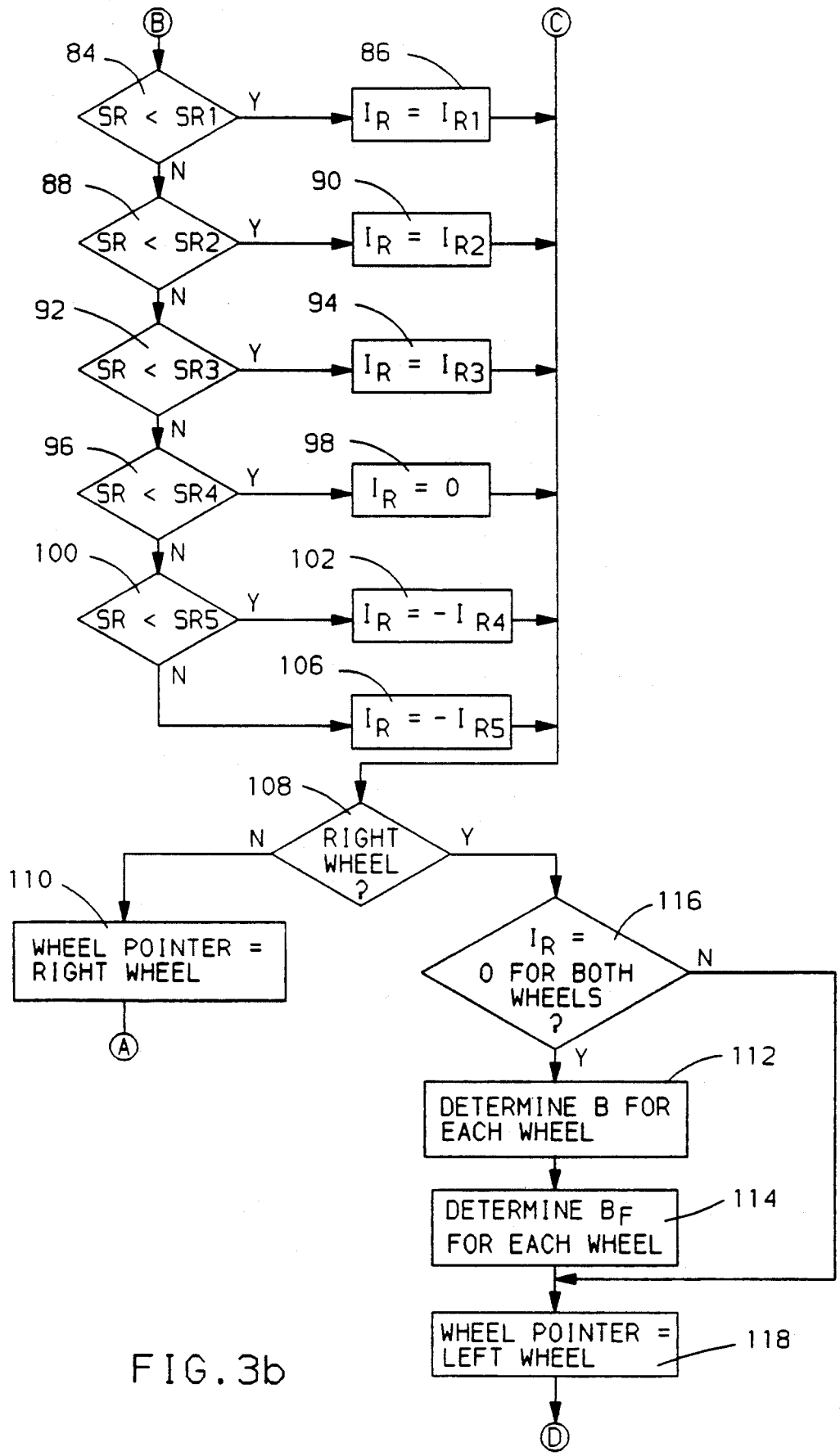
Figure 3C:
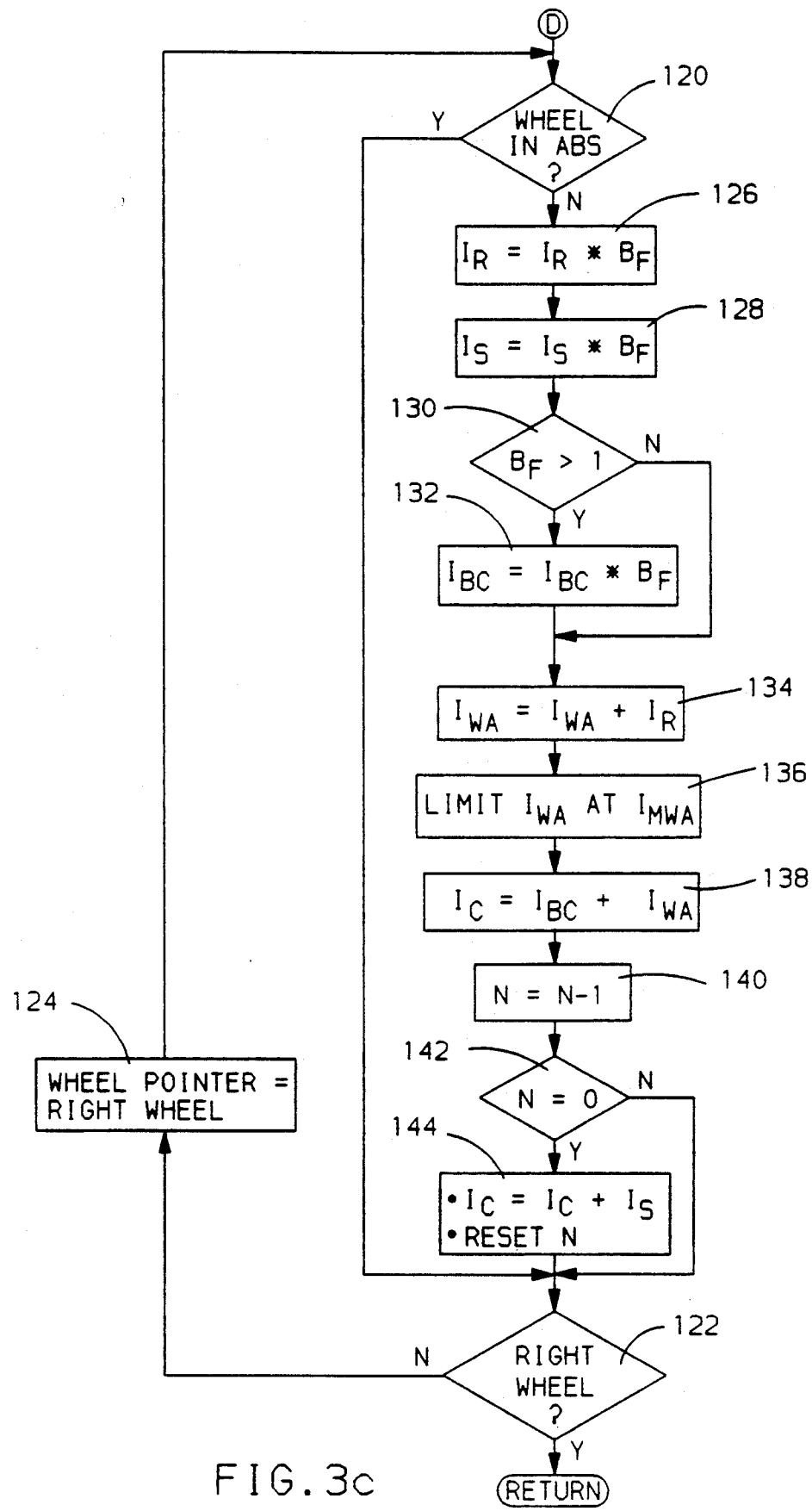

Referring to FIGS. 3a, 3b and 3c, the routine 52 for controlling the rear brakes 28 and 30 in accord with this invention is illustrated. This routine is entered at point 58 and proceeds to step 60 where it determines if the brake switch 35 is on indicating the vehicle operator is applying force to the brake pedal 23 to operate the vehicle brakes. If not, a step 62 initializes various parameters used in the control routine. Specifically, wheel adjust current values $I_{WA}$, current ramp values $I_R$ and current command values $I_C$ to the torque motors in the brakes 28 and 30 are set to zero, a spike time count N is initialized and a brake pedal pressure sensor offset value is set equal to the measured output value P of the pressure sensor 34. Following step 62, the program returns to the control cycle routine of FIG. 2.

Returning to step 60, if the operator has depressed the brake pedal 23 to actuate the vehicle brakes, a step 64 sets a wheel pointer to indicate the left wheel 14. In this respect, the rear brake control routine is executed for the wheel indicated by the wheel pointer using the parameters and values that are associated with that wheel. The routine is executed first for one of the rear wheels (the left wheel 14 in this case) and is then repeated for the other rear wheel using the parameters and values associated therewith. Further, the values established by the routine relate to the wheel that is indicated by the wheel pointer.

At step 66 a maximum allowable wheel adjust current offset ($I_{MWA}$) from a base motor current command $I_{BC}$ is computed according to the expression $I_P*K$ where $I_P$ is a current proportional to and representing the operator established braking command represented by the pedal pressure value P and K is a constant. Further at step 66, the base motor current command $I_{BC}$ is computed according to the expression $I_P - I_O + I_{F/R}$ where $I_P$ is defined above, $I_O$ is a current proportional to and representing the pressure sensor offset value established at step 62 and $I_{F/R}$ is a current to establish desired front to rear brake proportioning. Finally at step 66, a ramp mode indicator is set to represent no mode. As will be described, the current of the motor in the electric rear brake is established at a motor current command value $I_C$ that is based on the sum of base motor current command $I_{BC}$ and an adjustment current $I_{WA}$ within the limits of the maximum allowable wheel adjust current offset value $I_{MWA}$ so as to establish the desired speed ratio SR or to induce an incipient wheel lockup condition to enable antilock brake control and further adjusted so as to compensate for torque imbalances between the left and right braking systems of the rear wheels 14 and 16.

The routine next determines at step 68 if the wheel parameters indicate a requirement for antilock controlled braking. This requirement may be represented by wheel deceleration, wheel slip or a combination of wheel deceleration and slip exceeding predetermined threshold values thereby indicating an incipient wheel lockup condition. If the parameters indicate a need for antilock controlled braking, a known antilock control routine is executed at step 69 to limit the current command $I_C$ to the torque motor of the brake of the wheel identified by the wheel pointer so as to prevent wheel lockup. For example, the routine executed at step 69 may take the form of the routine described in U.S. Pat. No. 4,881,784 issued on Nov. 21, 1989 and assigned to the assignee of this invention. In general, this routine operates in similar manner as the front wheel ABS routine 50.

Returning to step 68, if the parameters do not indicate a need for limiting the brake pressure to prevent a wheel lockup condition, the routine proceeds to determine a motor current ramp rate $I_R$ for establishing a rate of adjustment of the motor current command $I_C$ and therefore brake pressure to achieve desired braking characteristics as will be described. First, at step 70, the routine determines if the matching front wheel (the front wheel on the same side of the vehicle as the rear wheel indicated by the wheel pointer) is being limited by operation of the front wheel antilock braking routine 50. If so and in accord with this invention, the motor current ramp rate $I_R$ is set to unity at step 72 representing a fast brake pressure apply rate. As will be described, the command current $I_C$ of the torque motor of the brake of the wheel identified by the wheel pointer will be quickly ramped upward in response to this set ramp rate to quickly increase the brake pressure to induce an incipient wheel lockup condition at which time antilock controlled braking of the wheel is initiated via step 68.

If step 70 determines that the matching front wheel is not in an antilock braking mode, the motor current ramp rate $I_R$ is set to zero representing a current hold mode to inhibit adjustment of the base motor current command if the vehicle speed and deceleration values are below respective thresholds where closed loop control of rear wheel speed relative to the front wheel speed cannot be reliably accomplished. Specifically, the current ramp rate $I_R$ is set to zero at step 74 if step 76 indicates that vehicle speed is not greater than a threshold for closed loop control of rear wheel speed or at step 78 if step 80 indicates that the vehicle deceleration is not greater than a threshold D.

If neither of the conditions for setting the adjustment ramp rate to zero at steps 74 or 78 exists, the program proceeds to execute a series of steps for setting a motor current ramp rate for closed loop control of the speed ratio SR of the front wheel speed to the rear wheel speed at a predetermined desired ratio. In this embodiment, the desired speed ratio is represented by a narrow speed ratio range slightly less than unity such that the rear wheel speed is slightly higher than the matching front wheel speed and the rear wheel slip is slightly lower than the matching front wheel slip. The ramp rate $I_R$ is established as a function of the error in the speed ratio SR. Particularly, the ramp rate $I_R$ is varied in direct proportion to the absolute magnitude of the error between the actual and desired speed ratios. The ramp rate $I_R$ is positive to effect an increase in the command current $I_C$ to the brake torque motor when the speed ratio SR is less than the desired ratio (rear wheel speed too high relative to the matching front wheel speed) and is negative to effect a decrease in the command current to the brake torque motor when the speed ratio is greater than the desired ratio (rear wheel speed too low relative to the matching front wheel speed).

The establishment of the motor current ramp rate $I_R$ begins at step 82 where the actual speed ratio SR is computed in accord with the expression $\omega_F/\omega_R$ where $\omega_R$ is the speed of the rear wheel identified by the wheel pointer and $\omega_F$ is the speed of the front wheel on the same side of the vehicle. Next, the ramp rate $I_R$ is established based on the error in the speed ratio relative to the desired ratio by determining the speed ratio range and setting $I_R$ to a value corresponding to the determined speed ratio range. In general, progressively increasing wheel speed ratio threshold values SR1 through SR5 define six wheel speed ratio ranges with the range between ratios SR3 and SR4 comprising a desired speed ratio range. Speed ratios less than SR3 indicate a rear wheel speed that is too high requiring an increase in braking force to establish the speed ratio in the desired range and speed ratios greater than SR4 indicate a rear wheel speed that is too low requiring a decrease in braking effort to establish the speed ratio in the desired range.

The first steps beginning with step 84 determine in which range the speed ratio SR lies when the wheel speed is greater than the desired wheel speed. If step 84 determines the speed ratio SR is greater than SR1 representing a large speed error, the motor current ramp rate $I_R$ is set to $I_{R1}$ at step 86. $I_{R1}$ represents a large ramp rate to quickly effect an adjustment of the brake motor current. In one embodiment SR1 is 0.995 and $I_{R1}$ is unity. If step 88 determines the speed ratio SR is in the range between SR1 and SR2, representing an intermediate speed error, the current ramp rate IR is set to $I_{R2}$ at step 90. $I_{R2}$ represents an intermediate motor current ramp rate. In one embodiment, SR2 is 0.996 and $I_{R2}$ is 0.05. If step 90 determines the speed ratio SR is in the range between SR2 and SR3, representing a low speed error, the motor current ramp rate $I_R$ is set to $I_{R3}$ at step 94. $I_{R3}$ represents a low motor current ramp rate. In one embodiment, SR3 is 0.997 and $I_{R3}$ is 0.12.

Step 96 determines if the speed ratio SR is in the desired range between SR3 and SR4. If the speed ratio SR is in the desired range, the motor current ramp rate $I_R$ is set to zero representing a hold mode so that no adjustment will be made to the motor current for control of rear wheel speed. In one embodiment, SR4 is 0.998.

The remaining step 100 determines in which of two ranges the speed ratio SR lies when the rear wheel speed is lower than the desired wheel speed. If step 100 determines the speed ratio SR is in the range between SR4 and SR5, representing a low speed error, the current ramp rate $I_R$ is set to $-I_{R4}$ at step 102. $-I_{R4}$ represents a low motor current ramp rate. Otherwise step 100 determines the speed ratio SR is in a range greater than SR5 representing a large speed error and the current ramp rate $I_R$ is set to $-I_{R5}$ at step 106. $-I_{R5}$ represents a high motor current ramp rate. In one embodiment, SR5 is 0.999, $-I_{R4}$ is $-1.0$ and $-I_{R5}$ is $-2.0$.

The ramp rate established by the steps 82-106 will be used as subsequently described to control the rate of adjustment of the motor current and therefore rear wheel braking effort to control the rear wheel speed so as to establish the speed ratio within the desired speed ratio range.

Following execution of the antilock braking routine 69 or the steps 70-106 for establishing the motor current ramp rate, step 108 determines if the wheel pointer indicates the right wheel thereby indicating that the foregoing steps beginning at step 66 have been executed for both rear wheels 14 and 16. If not, step 110 sets the wheel pointer to indicate the right wheel and the routine returns to step 66 after which the routine as set forth above is repeated for the right wheel 16 using and generating parameters associated with that wheel.

Due to factors such as side to side differences in brake wear, wheel brake efficiency, actuator mechanism efficiency, motor efficiency, or controller output gain, the gains of the brake systems associated with the left and right wheels 14 and 16 may vary. These variances may result in left to right side current to brake torque imbalances. Because of these imbalances, the braking performance of the left and right rear wheels will differ even though there is identical control of the current to the individual brake torque motors. For example, a given motor current will result in different braking efforts of the left and right wheels 14 and 16 and a given motor current ramp rate to each of of the motors will result in different ramp rates of the left and right side braking efforts.

The current to the torque motors of the electric brakes 28 and 30 are biased to compensate for the left to right current to torque imbalance of the left and right wheel braking systems. In general, the amount of the bias is determined when the motor current ramp rates $I_R$ of both rear wheels 14 and 16 are equal to 0 (a motor current hold mode) indicating each wheel is currently braked such that its associated speed ratio SR is within the desired range between SR3 and SR4 and is therefore balanced with its associated front wheel. When this condition exists, it is assumed that the braking effort of the left and right wheels are substantially equal and the difference between the motor currents is the result of differences in the gains of the left and right side braking systems.

A bias factor upon which the bias adjustment is based is determined via steps 112 and 114 if a step 116 first determines that the braking of each of the left and right wheels 14 and 16 are balanced with its associated front wheel 10 and 12. This balanced condition exists when the braking effort of the rear wheel is established at the desired level at which the speed ratio SR is within the desired range and is represented by a motor current ramp rate $I_R$ being set to zero at step 98 when step 96 indicates the speed ratio of the rear wheel is in the desired range. If step 116 determines that the ramp rate $I_R$ for both of the rear wheels 14 and 16 are not zero indicating that both wheels are not balanced with the corresponding front wheels, the steps 112 and 114 are bypassed, However, if step 116 determines a balanced condition for both wheels, step 112 determines a bias factor B for each of the rear wheels 14 and 16. The bias factor B for each wheel is computed by dividing the motor current command $I_C$ of that wheel by the motor current command $I_C$ of the other wheel. The bias factor B for each wheel is then filtered at step 114 to form a filtered bias factor $B_F$ for each wheel. In one embodiment the filtering may be provided by operation of a first order lag filter expression $B_F = B_F + (B - B_F)*K$ where K is a filter time constant.

The resulting filtered bias adjustment will have a value equal to unity if the left and right braking systems have identical braking characteristics, a value greater than unity for the wheel whose braking system gain is lowest thereby requiring a larger torque motor current to establish the desired speed ratio SR and a value less than unity for the wheel whose braking system gain is highest thereby requiring a smaller torque motor current to establish the desired speed ratio SR.

The next step 118 sets the wheel pointer to indicate the left wheel. Thereafter, the routine establishes the motor current command $I_C$ of the indicated wheel if the motor current command of that wheel is not being controlled by the antilock brake control routine 69. This condition is sensed at step 120. If the wheel braking is under control of the antilock brake routine 69, step 122 determines if the wheel pointer is indicating the right wheel. If not, step 124 sets the wheel pointer to indicate the right wheel after which the routine returns to step 120.

If step 120 determines that the motor command current $I_C$ is not being controlled by the antilock brake control routine 69, step 126 adjusts the motor current ramp rate $I_R$ established via steps 82-106 by multiplying the motor current ramp rate $I_R$ by the filtered bias adjustment $B_F$ for that wheel. This effectively increases the gain of that wheel's braking system if that wheel has the weaker braking system (requiring a larger motor current to establish the desired speed ratio) and decreases the gain of that wheel's braking system if that wheel has the stronger braking system (requiring a smaller motor current to establish the desired speed ratio). At the next step 128, a spike current value $I_S$ is adjusted in similar manner by the filtered bias adjustment $B_F$.

Next, the base current command $I_{BC}$ of the wheel having the weaker braking system (smaller braking for a given torque motor current) and which was initially established at step 66 is increased by the filtered bias adjustment factor $B_F$. The step 130 first determines if the wheel identified by the pointer has a filtered bias adjustment factor $B_F$ that is greater than unity indicating that wheel is the wheel having the braking system with the higher gain (greater braking for a given torque motor current). If not, indicating that the wheel identified by the wheel pointer has the weaker braking system, the motor current brake command $I_{BC}$ established at step 66 is increased by the bias adjustment factor $B_F$ for the identified wheel. Otherwise, the step 132 is bypassed so that the base brake current command $I_{BC}$ of the wheel with the stronger braking system is not adjusted.

At the next step 134, a wheel adjust current $I_{WA}$ is adjusted by the motor current ramp rate value $I_R$ determined by steps 82-106. The resulting value is limited at step 136 to the maximum wheel adjust current $I_{MWA}$ computed at step 66 and then summed with the bias adjusted base motor current command $I_{BC}$ at step 138 to derive the motor current command $I_C$ compensated for left to right current to torque imbalances. Upon repeated executions of the rear brake control routine, the wheel adjust current is ramped via step 134 at a rate determined by the bias adjusted ramp rate $I_R$ resulting in the motor command current $I_C$ being ramped via step 138 at the bias adjusted ramp rate $I_R$.

In order to reduce hysteresis and mechanical delays, a spike current is periodically provided to the torque motors of the electric brakes 28 and 30. The period between the current spikes is represented by a predetermined number of control cycle interrupt intervals. This number is the initial value of N set at step 62 prior to operation of the brake pedal 23 by the operator. The value of N is decremented at step 140 and compared with zero at step 142. When N has been decremented to zero, step 144 adds the spike current $I_S$ as adjusted by the filtered bias adjustment at step 128 to the motor current command $I_C$. The value of N is then reset to initiate another spike current timing interval. As long as step 142 determines that N is not zero, step 144 is bypassed.

Step 122 next determines if the steps 120-144 have been executed for each rear wheel 14 and 16. If not, the wheel pointer is set to indicate the right wheel and the steps are repeated for that wheel to establish the motor current command for the torque motor of the electric brake 30. When the steps beginning with step 120 has been executed for both wheels 14 and 16, the program returns to the control cycle routine from step 122.

The motor current commands for each of the torque motors in the electric brakes 28 and 30 established by the brake control routine 52 are then commanded to the respective torque motors at step 54 of the control cycle.

As long as the matching front wheel is not experiencing antilock controlled braking, upon repeated executions of control cycle, steps 126 through 138 ramp the commanded current $I_C$ for each wheel in accord with the motor current ramp rate $I_R$ adjusted by the bias adjustment to provide for closed loop control of each rear wheel speed to establish the desired speed ratio. Further, upon repeated adjustments of the filtered motor current bias adjustment $B_F$ for each wheel while both of the rear wheels are at the speed establishing the desired speed ratio, a bias adjustment value is learned that provides compensation for current to torque imbalances between the braking systems for the left and right wheels 14 and 16.

In accord with this invention, upon repeated executions of the control cycle interrupt, steps 126-138 quickly ramp the value of the motor command current $I_C$ at the rapid rate set via steps 70 and 72 independent of the speed of the matching front wheel when that front wheel first enters into an antilock braking mode so as to quickly induce an incipient wheel lockup condition. When this condition is sensed at step 68, the motor command current $I_C$ is then established by step 69 to provide antilock controlled braking in the known manner.

While a specific preferred embodiment has been described, it is understood that many modifications may be made by the exercise of skill in the art without departing from the scope of the invention.

The embodiments of the invention in which an exclusive property or privilege is claimed are defined as follows:

1. A method of controlling brake pressure applied to a brake of a rear wheel of a vehicle having a front wheel, a front wheel brake and a front wheel antilock brake system responsive to an incipient wheel lockup condition of the front wheel for limiting brake pressure applied to the front wheel brake, the method comprising the steps of:
   sensing the speed of the front wheel;
   sensing the speed of the rear wheel;
   applying brake pressure to the rear brake so as to establish the sensed rear wheel speed at a predetermined relationship to the sensed front wheel speed;
   progressively increasing the brake pressure applied to the rear brake independent of the front wheel speed, when the front wheel antilock brake system limits the brake pressure applied to the front wheel brake in response to an incipient wheel lockup condition, so as to induce an incipient wheel lockup condition of the rear wheel; and
   limiting the brake pressure applied to the rear brake in response to an incipient wheel lockup condition of the rear wheel.

2. A method of controlling brake pressure applied to a brake of a rear wheel of a vehicle having a front wheel, a front wheel brake and a front wheel antilock brake system responsive to an incipient wheel lockup condition of the front wheel for limiting brake pressure applied to the front wheel brake, the method comprising the steps of:
   sensing the speed $\omega_F$ of the front wheel;
   sensing the speed $\omega_R$ of the rear wheel;
   determining a speed ratio of the sensed speeds $\omega_F$ and $\omega_R$;
   applying brake pressure to the rear brake so as to establish the determined speed ratio at a predetermined ratio;
   progressively increasing the brake pressure applied to the rear brake independent of the determined speed ratio, when the front wheel antilock brake system limits the brake pressure applied to the front wheel brake in response to an incipient wheel lockup condition, so as to induce an incipient wheel lockup condition of the rear wheel; and
   limiting the brake pressure applied to the rear brake in response to an incipient wheel lockup condition of the rear wheel.

3. The method of claim 2 wherein the speed ratio is determined in accord with the expression $\omega_F/\omega_R$ and the predetermined ratio has a value less than unity.

4. A system for controlling brake pressure applied to respective brakes of front and rear wheels of a vehicle, the system comprising, in combination:
   means for sensing the speed of the front wheel;
   means for sensing the speed of the rear wheel;
   means for applying brake pressure to the brake of the front wheel in accord with an operator braking demand;

antilock brake pressure control means for limiting the brake pressure applied to the brake of the front wheel in response to an incipient wheel lockup condition of the front wheel;

means for applying brake pressure to the rear brake so as to establish the sensed rear wheel speed at a predetermined relationship to the sensed front wheel speed;

means for progressively increasing the brake pressure applied to the rear brake independent of the front wheel speed, when the antilock brake pressure control means limits the brake pressure applied to the front wheel brake in response to an incipient wheel lockup condition, so as to induce an incipient wheel lockup condition of the rear wheel; and means for limiting the brake pressure applied to the rear brake in response to an incipient wheel lockup condition of the rear wheel.

* * * * *